US011421439B1

(12) United States Patent
Sargent (10) Patent No.: US 11,421,439 B1
(45) Date of Patent: Aug. 23, 2022

(54) TENT APPARATUS AND METHOD OF MANUFACTURE

(71) Applicant: Weave Composites, Oceanside, CA (US)

(72) Inventor: Nathan Thomas Sargent, Oceanside, CA (US)

(73) Assignee: Weave Composites, Oceanside, CA (US)

( * ) Notice: Subject to any disclaimer, the term of this patent is extended or adjusted under 35 U.S.C. 154(b) by 0 days.

(21) Appl. No.: 17/495,630

(22) Filed: Oct. 6, 2021

(51) Int. Cl.
  *E04H 15/06* (2006.01)
  *E04H 15/42* (2006.01)
  *B60P 3/36* (2006.01)
(52) U.S. Cl.
  CPC ............... *E04H 15/06* (2013.01); *B60P 3/36* (2013.01); *E04H 15/425* (2013.01)
(58) Field of Classification Search
  None
  See application file for complete search history.

(56) References Cited

U.S. PATENT DOCUMENTS

| 4,263,925 A * | 4/1981 | Arganbright | ........... B62D 33/08 135/118 |
| 4,310,194 A * | 1/1982 | Biller | ........................ B60P 3/32 135/88.13 |
| 4,332,265 A * | 6/1982 | Baker | ....................... B60P 3/34 135/115 |
| 4,652,040 A | 3/1987 | Mahan | |
| 4,657,299 A | 4/1987 | Mahan | |
| D324,405 S | 3/1992 | Cantwell | |

(Continued)

FOREIGN PATENT DOCUMENTS

| EM | 0062586790003 | 3/2019 |
| EM | 0062616990002 | 3/2019 |
| EM | 0075379560001 | 1/2020 |

OTHER PUBLICATIONS

Alibaba; "1 Person Folding Off the Ground Camping Sleeping Bed tent cot,Camping cot Bed Tent,CZ-336 Camping tent build on cot or use alone"; https://www.alibaba.com/product-detail/1-Person-Folding-Off-The-Ground_62186920981 .html?spm=a2700.galleryofferlist.normal_offer.d_image.348774c6PGBTim [retrieved from the internet on Oct. 6, 2021] Aug. 16, 2018 (19 pages).

(Continued)

*Primary Examiner* — David R Dunn
*Assistant Examiner* — Danielle Jackson
(74) *Attorney, Agent, or Firm* — Esplin & Associates, PC (57) ABSTRACT

A tent apparatus and method of manufacture are described herein. The tent apparatus may comprise a tent body, a frame, and/or other components. The tent body may include a first portion configured to be substantially enclosed within the bed of the pickup truck in an as-used mode of the tent apparatus, and a second portion that extends from the first portion such that the second portion is exposed to an environment above a bed of a pickup truck in the as-used mode. The frame may be integrally coupled to the tent body, and configured to articulate between a closed position and an open position. The frame may comprise a central hub coupled to the tent body at a central coupling point; and support members that extend from the central hub to coupling points on the tent body to integrate the frame with the tent body.

16 Claims, 5 Drawing Sheets

(56) References Cited

U.S. PATENT DOCUMENTS

| | | | |
|---|---|---|---|
| 5,226,261 A * | 7/1993 | Wilbourn | B60J 7/102 |
| | | | 52/2.21 |
| D337,979 S | 8/1993 | Napieraj | |
| 5,299,849 A * | 4/1994 | Cook | B60J 7/104 |
| | | | 135/88.09 |
| 5,333,634 A | 8/1994 | Taylor | |
| 5,339,851 A | 8/1994 | Miller | |
| 5,353,826 A * | 10/1994 | Davis, Sr. | B60J 7/102 |
| | | | 135/119 |
| 5,954,076 A * | 9/1999 | McGinnis | E04H 15/06 |
| | | | 135/88.13 |
| 5,988,195 A * | 11/1999 | Kaestner | E04H 15/06 |
| | | | 135/144 |
| 6,021,795 A | 2/2000 | Long | |
| D461,759 S | 8/2002 | Napieraj | |
| 6,481,784 B2 * | 11/2002 | Cargill | B60P 3/341 |
| | | | 135/88.13 |
| 6,505,879 B1 * | 1/2003 | Arviso | B60J 7/102 |
| | | | 296/100.18 |
| 6,536,827 B2 * | 3/2003 | Oswald | B60R 13/01 |
| | | | 296/39.1 |
| 6,581,617 B2 | 6/2003 | Ham | |
| 6,616,212 B1 * | 9/2003 | Bishop | B60J 7/102 |
| | | | 135/158 |
| D503,143 S | 3/2005 | Napieraj | |
| 6,905,162 B2 * | 6/2005 | Lester | B60J 7/102 |
| | | | 296/100.16 |
| D516,497 S | 3/2006 | Napieraj | |
| 7,021,694 B1 * | 4/2006 | Roberts | B60J 7/102 |
| | | | 135/88.13 |
| D534,614 S | 1/2007 | Gallaway | |
| D583,747 S | 12/2008 | Napieraj | |
| 7,677,641 B1 * | 3/2010 | Isoda | B60P 3/341 |
| | | | 296/159 |
| D638,343 S | 5/2011 | Kramer | |
| D651,678 S | 1/2012 | Muggleton | |
| 8,448,656 B2 * | 5/2013 | Choi | E04H 15/44 |
| | | | 135/135 |
| 8,550,538 B1 | 10/2013 | Brandenburg | |
| D695,375 S | 12/2013 | Jin | |
| D695,376 S | 12/2013 | Jin | |
| D702,791 S | 4/2014 | Jin | |
| D718,828 S | 12/2014 | Jin | |
| 9,487,147 B1 | 11/2016 | Morrill | |
| 9,624,688 B1 * | 4/2017 | Tyson | B60P 3/39 |
| D796,420 S | 9/2017 | Abrams | |
| D813,782 S | 3/2018 | Cropley | |
| D820,192 S | 6/2018 | Currid | |
| D824,322 S | 7/2018 | Rossi | |
| D838,801 S | 1/2019 | Chaklos | |
| D841,107 S | 2/2019 | Zhu | |
| D858,676 S | 9/2019 | Xu | |
| D870,835 S | 12/2019 | Xiao | |
| D872,209 S | 1/2020 | Zhu | |
| D872,210 S | 1/2020 | Zhu | |
| D872,818 S | 1/2020 | Zhu | |
| D879,231 S | 3/2020 | Zhu | |
| D902,125 S | 11/2020 | Matras | |
| D902,833 S | 11/2020 | McGregor | |
| D925,686 S | 1/2021 | Guo | |
| D910,137 S | 2/2021 | Zhang | |
| D910,138 S | 2/2021 | Chen | |
| D910,795 S | 2/2021 | Zhu | |
| D931,400 S | 2/2021 | Mei | |
| D915,995 S | 4/2021 | Kerr | |
| D916,223 S | 4/2021 | Chen | |
| D921,148 S | 6/2021 | Xiao | |
| D921,811 S | 6/2021 | Cheng | |
| D926,908 S | 8/2021 | Wright | |
| D928,899 S | 8/2021 | Zhu | |
| D935,378 S | 11/2021 | Chen | |
| D938,890 S | 12/2021 | Min | |
| 2006/0016467 A1 | 1/2006 | Bae | |
| 2008/0210282 A1 * | 9/2008 | Turcot | E04H 15/06 |
| | | | 135/88.14 |
| 2016/0332556 A1 * | 11/2016 | Robertson | B60P 7/04 |

OTHER PUBLICATIONS

Alibaba.com; "Naturehike P-Series upgrade UPF 50+ zelt barraca 2 3 4 Man Tent waterproof Family foldable tents camping outdoor"; https://www.alibaba.com/product-detail/Naturehike-P-Series-upgrade-UPF-50_60478800140.html?spm=a2700.galleryofferlis.normal_offer.d_image.348774c6PGBTim [retrieved from the internet on Oct. 6, 2021] 2016 (15 pages).

Chicago Tribune—Pioneer Press Gifts for the Adventure Lover; Nov. 22, 2018 (1 page).

InvictusEdge; "Pickup truck bed tent"; https://www.invictusedge.com/product-page/pick-up-truck-tent [retrieved from the internet on Sep. 30, 2021] Jun. 13, 2020 (2 pages).

Joy Tutus; 2 People Portable Pickup Truck Tent 5.5'-6')https://www.joytutus.com/products/portable-pickup-truck-tent-waterproof-for-camping?variant=39373435535475 [retrieved from the internet on Sep. 30, 2021] Jun. 17, 2021 (9 pages).

Moon Lence; Amazon.com; "Moon Lence Instant Pop Up Tent Family Camping Tent 4-5 Person Portable Tent Automatic Tent Waterproof Windproof for Camping Hiking Mountaineering" https://www.amazon.com/MOON-LENCE-Automatic-Waterproof-Mountaineering/dp/B0827J35KL [retrieved from the internet on Sep. 30, 2021] Dec. 1, 2019 (9 pages).

Nanjing Adaize Trade Co., Ltd.; Made-in-China.com; "Wholesale Cheap and Best SUV Tent, Pickup Truck Tent" https://njadai.en.made-in-china.com/product/nBjmCXSukdVP/China-Wholesale-Cheap-and-Best-SUV-Tent-Pickup-Truck-Tent.html [retrieved from the internet on Sep. 30, 2021] Mar. 2, 2021 (2 pages).

Rick Stella; BusinessInsider.com; "The 4 best truck bed tents, perfect for use at a campsite or while overlanding" https://www.businessinsider.com/best-truck-bed-tent#the-best-overall-1 [retrieved from the internet on Sep. 30, 2021] Mar. 24, 2021 (17 pages).

Sears.com; "North East Harbor Pickup Truck Bed Camping Tent, 2-Person Sleeping Capacity, Includes Rainfly and Storage Bag—Fits Full Size Truck with Short;" https://www.sears.com/north-east-harbor-pickup-truck-bed-camping-tent/p-A065017098 [retrieved from the internet on Sep. 30, 2021] Oct. 20, 2020 (6 pages).

Tru Vick; Truck Enthusiasts; "Top 7 Best Truck Tents—2021 Complete Reviews & Buying Guide" https://trucksenthusiasts.com/best-truck-bed-tents-buying-guide/ [retrieved from the internet on Oct. 6, 2021] Jan. 5, 2021 (51 pages).

TSC Tractor Supply CO; "Napier Sportz Truck Tent for Full-Size Regular Beds, 57022"; https://www.tractorsupply.com/tsc/product/napier-sportz-truck-tent-full-size-regular-57022 [retrieved from the internet on Sep. 30, 2021] Oct. 23, 2020 (3 pages).

* cited by examiner

TENT APPARATUS AND METHOD OF MANUFACTURE

FIELD OF THE DISCLOSURE

This disclosure relates to a tent apparatus and method of manufacture.

BACKGROUND

Assembly of camping tents for outdoor camping often require time and some expertise of tent configurations and/or components. Moreover, a ground where a camping tent may be staked may not be ideal. For example, the ground may be overwhelmed with various rocks, be cold, comprise of lose soil or dirty where tent stakes are unusable, and/or other less than ideal ground. Further, campers may have to deal with water, streams, insects and/or animals when tent camping on the ground.

SUMMARY

One or more aspects of the present disclosure relate to a tent apparatus, in particular, a tent apparatus having features and/or functionality of automatically and/or semi-automatically erecting the tent apparatus for positioning in a bed of a pickup truck. One or more implementations of a tent apparatus described herein may reduce time, effort, and/or expertise by facilitating one or more users with erecting the tent apparatus via both a frame and a tent body, and collapsing and stowing of the tent apparatus. Furthermore, such positioning in the bed of the pickup truck may provide a predictable surface usable for more enjoyable camping. The tent apparatus may be configured for trucks of all sizes, including but not limited to, midsize pickup trucks and full-size pickup trucks.

The tent apparatus may include one or more of a tent body, a frame, and/or other components. The tent body may include a first portion, a second portion, and/or other portions. The first portion may be configured to be enclosed and/or substantially enclosed within a bed of a pickup truck in an as-used mode of the tent apparatus. The second portion may extend from the first portion. The second portion may be exposed to an environment above the bed of the pickup truck in the as-used mode.

The frame may be integrally coupled to the tent body. The frame may be integrated with the tent body in a non-removable and/or substantially non-removable engagement via one or more coupling points. In some implementations, one or more portions of the frame may be removable from the tent body and/or from other portions of the frame itself. The frame may be configured to articulate between a closed position and an open position. The closed position may correspond to a stowed mode of the tent apparatus where the frame and the tent body are consolidated into a stowed volume. The open position of the frame may correspond to the as-used mode of the tent apparatus such that the frame structurally supports the tent body to provide rigidity for the tent apparatus. The frame may include one or more of a central hub, one or more support members, and/or other components.

The central hub may be coupled to the tent body at a central coupling point. In some implementations, the central coupling point may be a non-removable coupling of the frame to the tent body. The one or more support members may extend from the central hub to coupling points on the tent body to integrate the frame with the tent body. As such, by way of non-limiting illustration, a first set of the coupling points may be at a first end of the tent body, and a second set of the coupling points may be at a second end of the tent body. The second end may be opposite the first end.

A method of manufacture of a tent apparatus may comprise one or more of: forming a tent body; forming a frame; integrally coupling the tent body to the frame; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
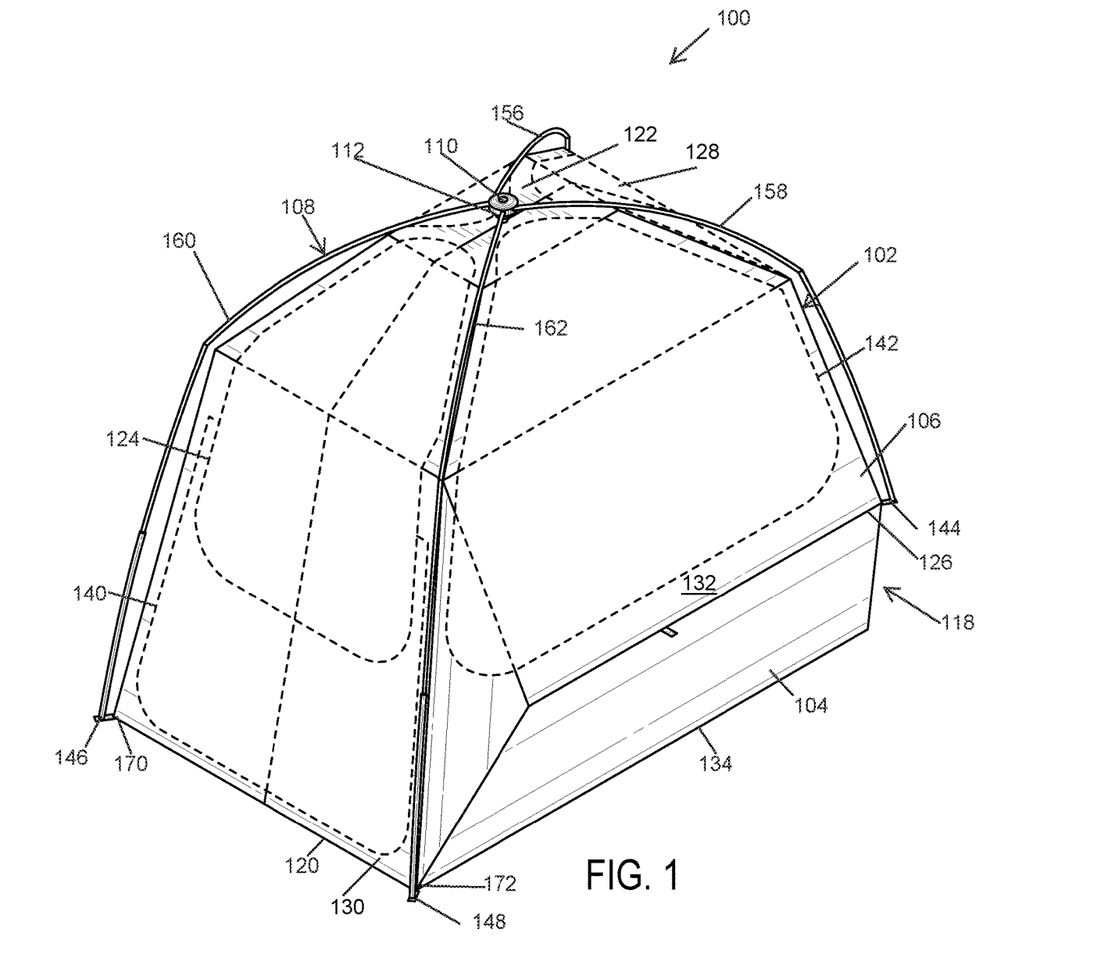
FIG. 1 illustrates a view of a tent apparatus, in accordance with one or more implementations.

FIG. 1 illustrates a view of a tent apparatus 100 having one or more components that are dimensioned and arranged to be positioned in a bed of a pickup truck. A bed of pickup truck may include one or more of a front panel, a tailgate panel opposite front panel, a first side panel, a second side panel opposite first side panel, a bed floor, and/or other components. First side panel and second side panel may include bed rails. The bed rails may include a first bed rail on the first side panel and a second bed rail on the second side panel. The front panel may be adjacent to a cab of the pickup truck. Different views of the tent apparatus 100 are shown in FIGS. 1-5, with like reference numerals referring to like components. FIG. 6 illustrates the tent apparatus 100 in an as-used mode. Other components not illustrated but may be included with the tent apparatus 100 include one or more of a rainfly, securing/anchoring straps or clips to secure the tent apparatus to the truck bed, one or more sunshades, an overhanging enclosed vestibule area (e.g., as a changing area), and/or other components.

Referring to FIG. 1, in some implementations, tent apparatus 100 may comprise one or more of a tent body 102, a frame 108, and/or other components. It is noted that terms such as "left," "right," "upper," "lower," "top," "bottom," "proximal," "distal," and/or other direction terms herein may refer to conventional use of such terms as applied to conveying spatial orientation with respect to an as-used mode of the tent apparatus 100 that may become apparent to a person of ordinary skill in the art upon reading this disclosure. The use of these terms with various components should therefore be easily understood by a person skilled in the art as related to orientation, direction, and/or disposition. Further, directions may be specifically defined herein and/or shown in the figures.

In FIG. 1, tent body 102 may include one or more of a first portion 104, a second portion 106, a transition portion 126, and/or other portions. First portion 104 may be configured to be substantially enclosed within the bed of the pickup truck in an as-used mode of tent apparatus 100. That is, in some implementations, first portion 104 may be enclosed by one or more of a front panel, a first side panel, and/or a second side panel of a bed of a pickup truck (see, e.g., FIG. 6). In some implementations, first portion 104 may be enclosed by one or more of the front panel, the first side panel, the second side panel, and a tailgate panel of the bed.

Second portion 106 may extend from first portion 104. The transition portion 126 may comprise an area or location between the second portion and the first portion 104. Second portion 106 may be exposed to an environment above the bed of the pickup truck in the as-used mode (see, e.g., FIG. 6). In some implementations, second portion 106 may be exposed to the environment above a first bed rail and a second bed rail.

The as-used mode of tent apparatus 100 may enable one or more users to enter and use an interior volume of tent body 102. A stowed mode (not shown) of tent apparatus 100 may enable storage of tent apparatus 100 where the interior volume is minimized or compacted. The environment, by way of non-limiting example, may include natural elements (e.g., wind, rain, sunshine, etc.), living things (e.g., insects), debris (e.g., tree leaves, dirt, sand, sap, etc.), and/or other environmental elements.

Transition portion 126 may extend from a first end 118 of tent body 102 to a second end 120, and may define where first portion 104 and second portion 106 of the tent body 102 meet. In some implementations, transition portion 126 may align with a height of the bed rails of a bed of truck in the as-used mode (see, e.g., FIG. 6). In some implementations, transition portion 126 may align under the bed rails and/or adjacent to an interior surface of the bed in the as-used mode. In some implementations, extra flaps of fabric (not shown) may be included at or near the transition area to cover all bed openings for water tightness.

Figure 4:
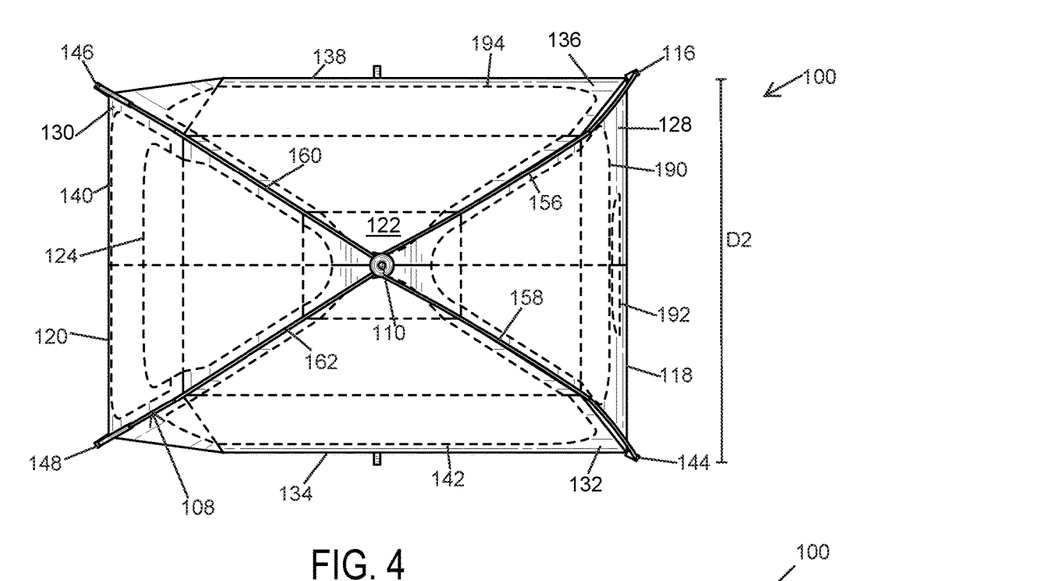
FIG. 4 illustrates a view of a tent apparatus, in accordance with one or more implementations.

Tent body 102 may include one or more of a set of side surfaces, a top surface 122, a bottom surface (not illustrated), and/or other surfaces. The set of side surfaces may include one or more of a first side surface 128, a second side surface 130, a third side surface 132, a fourth side surface 136 (not visible in FIG. 1, see FIG. 4), and/or other side surfaces. First side surface 128 may be at and/or facing the first end 118 (e.g., a back end) of tent body 102. Second side surface 130 may be at and/or facing the second end 120 (e.g., a front end) of tent body 102. First end 118 may be opposite second end 120. Third side surface 132 may be at and/or facing a third end 134 (e.g., one side of the tent body 102) of the tent body 102. Fourth side surface 136 may be at and/or facing a fourth end 138 (e.g., other side) of tent body 102 (see FIG. 4 for fourth end 138). In FIG. 4, fourth end 138 may be opposite third end 134. Top surface 122 may be opposite the bottom surface (not shown). In the as-used mode, the bottom surface may lie on the bed floor of the bed of the pickup truck. Furthermore, top surface 122 may be positioned above the bed rails to shelter the users. As such, tent body 102 may enclose the interior volume. In some implementations, the bottom surface may be padded using an air mattress construction and/or foam padding. In some implementations, the tent body 102 may not have a bottom surface. For example, the area of the bottom surface may be "open" and without material such that the bed of the truck itself become the "floor" of the tent apparatus 100.

In some implementations, second side surface 130 may include a door element 140. Door element 140 may be configured to open and close to enable the users to enter the interior volume of tent body 102 provided by the as-used mode. Door element 140 may include one or more fasteners to enable the opening and the closing of door element 140. The one or more fasteners may include a zipper fastener, hook and loop fastener, a magnet fastener, a snap fastener, and/or other fasteners. In some implementations, one or more sections of one or more of first side surface 128, third side surface 132, fourth side surface 136, and/or other surfaces of tent body 102 may include one or more window elements, one or more ventilation elements, and/or other elements. The window elements may include a window element 142 as shown on third side surface 132 in FIG. 1 and FIG. 5, and/or other window elements. Door element 140 and the one or more window elements described herein are depicted as dashed lines in FIGS. 1-6.

In some implementations, tent body 102 may include second portion 106 without one or more other portions. For example, tent body 102 may include second portion 106 without first portion 104 and/or a bottom surface. Accordingly, tent body 102 may not have a portion that is substantially enclosed within the bed of the pickup truck in an as-used mode of tent apparatus 100. Instead, tent body 102 may have a bottom portion that starts at or around the transition portion 126. The tent body 102 may sit on, and extend upward from, the bed rails of the bed of the pickup truck in an as-used mode of tent apparatus 100. Such an implementation of the tent body 102 may form a tent apparatus 100 that appears more as an extension of the bed of the truck rather than sitting within and/or extending from within the bed of the truck. In some implementations, a door component and/or additional flaps may extend from the second portion 106 to the tail gate of the truck bed.

Figure 3:
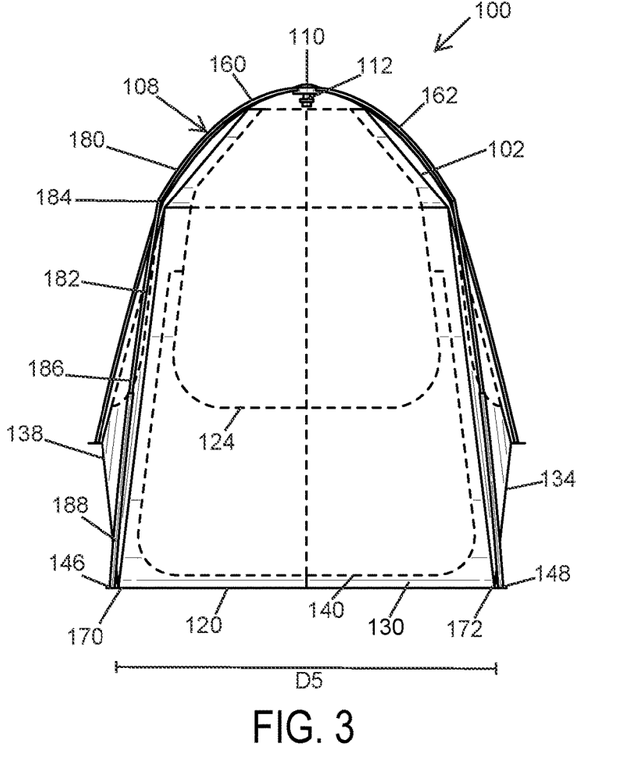
FIG. 3 illustrates a view of a tent apparatus, in accordance with one or more implementations.

Tent body 102 may include one or more materials comprising one or more of a polyester, a nylon, a canvas, an acrylic, a polyester mesh, a clear vinyl, a clear EVA, and/or other material. In some implementations, the window elements, e.g., window element 142, may include two or more of the materials. For example, tent body 102 may be a continuous surface that is configured of a first material (e.g., polyester) joined by sewn seams with a second material (e.g., mesh) at the one or more sections that include the one or more window elements. One or more additional layers of the first material may be joined adjacent to the sewn seams to cover the second material of the one or more sections. The one or more additional layers may include the one or more fasteners to enable removing one or more edges of the one or more additional layers from the continuous surface and fastening the one or more edges of the one or more additional layers to the continuous surface such that the window elements are opened and closed, respectively. In some implementations, the one or more additional layers may be configured on an interior surface of individual ones of the side surfaces and/or top surface 122, on an exterior surface of the side surfaces and/or top surface 122, or both. In FIG. 3, in some implementations, a window element 124, similar to window element 142, may be included on door element 140. In some implementations, individual ones of the window elements may be one of a rectangle shape, a circle shape, a rectangle shape, a rounded rectangle shape, a rounded rectangle shape, a hexagon shape, and/or other shapes.

Referring to FIG. 4, frame 108 may be integrally coupled to tent body 102. Integrally coupled frame 108 and tent body 102 may refer to tent body 102 being non-removable and/or substantially non-removable from frame 108 via one or more coupling points. However, in some implementations, one or more portions of the frame 108 may be removable from the tent body 102. Frame 108 may be configured to articulate between a closed position and an open position. The closed position may correspond to the stowed mode of tent apparatus 100 (not shown). In the closed position, frame 108 and tent body 102 may be consolidated into a stowed volume. The stowed volume may be a fraction of the interior volume and facilitate storing and/or packing of tent apparatus 100 into a bag, a container, and/or other device (not shown). The open position may correspond to the as-used mode of tent apparatus 100. In the open position, frame 108 may structurally support tent body 102 to provide rigidity for tent apparatus 100. In the open position, frame 108 and components thereof as described herein may be locked and secured such that frame 108 is standing upright without assistance.

In some implementations, one or more elements of frame 108 may be configured to provide technical assistance and/or to automatically articulate between the closed position and the open position. By way of non-limiting illustration, one or more elements of frame 108 may be configured to bias the frame 108 into the open position. The one or more elements may include one or more of spring loaded hinges, living hinges, spring-loaded actuators, user activated ropes or cords to set the frame 108 into the open position, and/or other elements. In some implementations, the tent apparatus 100 may have some components that automatically articulate and some components that may require manual articulation by the user.

Figure 5:
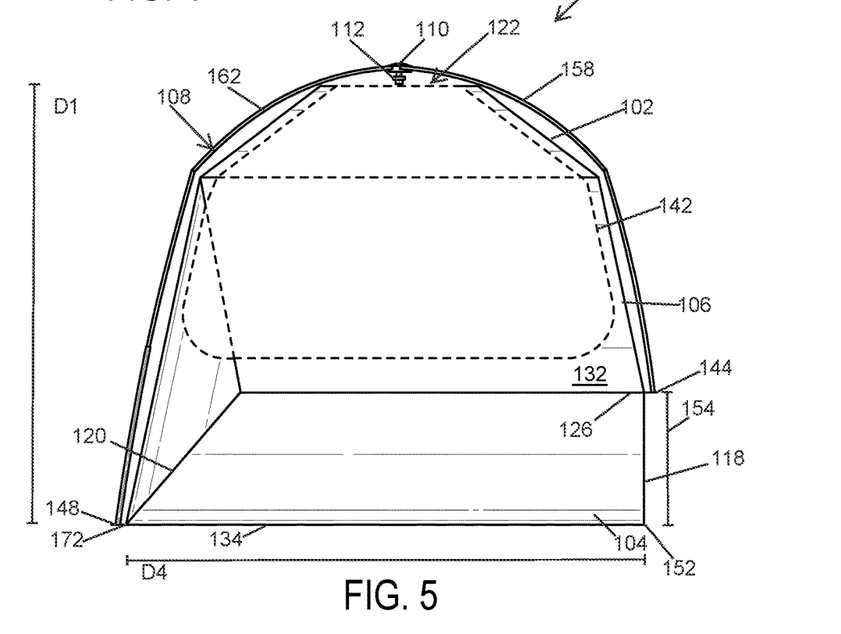
FIG. 5 illustrates a view of a tent apparatus, in accordance with one or more implementations.
Figure 6:
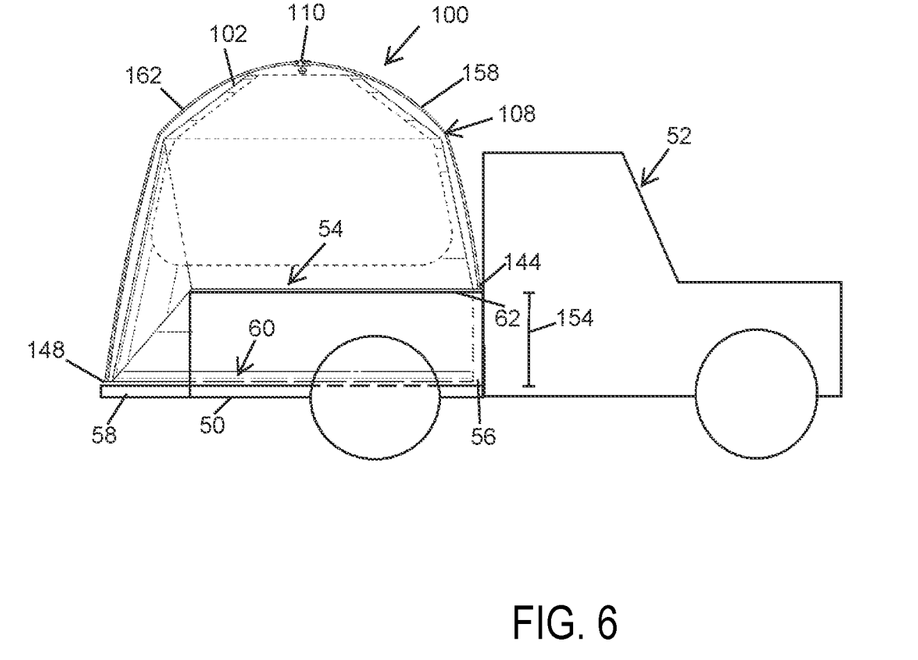
FIG. 6 illustrates a view of a tent apparatus, in accordance with one or more implementations.

Referring now to FIG. 5, frame 108 may comprise one or more of a central hub 110, one or more support members, and/or other components. Central hub 110 may be comprised of one or more durable materials such as one or more of a plastic, aluminum, fiberglass, carbon fiber, steel, and/or other durable material. Central hub 110 may be coupled to tent body 102 at central coupling point 112. Central coupling point 112 may couple and secure central hub 110 to tent body 102. In some implementations, top surface 122 may include central coupling point 112. A distance between the central coupling point 112 at the top surface 122 and the bottom surface may define a height, D1, of the tent apparatus 100 in the as-used mode. The height D1 may extend between the bottom surface and central coupling point 112 at the top surface 122. It is noted that the depiction and description of a single central hub 110 is for illustrative purposes only and not to be considered limiting. Instead, in some implementations, two or more central hubs may be utilized. Individual ones of the central hubs may be coupled to the top surface 122 and/or at other surfaces. Those skilled in the art may appreciate modifications to the structure and/or arrangement of support members that may be required to accommodate multiple central hubs and are within the scope of this disclosure.

One or more support members may extend from central hub 110 to coupling points on tent body 102 to integrate frame 108 with tent body 102. In the as-used mode, the extension of the one or more support members to the coupling points may facilitate structurally supporting tent body 102 and providing the rigidity for tent apparatus 100. In the as-used mode, tent apparatus 100 may be extend outward toward the first side panel, the second side panel, the front panel, and the tailgate panel of the bed and upward into the environment to provide the interior volume. In some implementations, the extension of the support members in the as-used mode may resemble a square shape, a rectangle shape, or other shaped tent apparatus 100. The one or more support members may be comprised of one or more durable materials.

Referring to FIG. 4, in some implementations, the one or more support members may include one or more of a first support member 156, a second support member 158, a third support member 160, a fourth support member 162, and/or other support members. First support member 156 may be adjacent to and/or between fourth end 138 and first end 118 of tent body 102. Second support member 158 may be adjacent to and/or between the first end 118 and third end 134 of the tent body 102. Third support member 160 may be adjacent to and/or between the fourth end 138 and second end 120 of the tent body 102. Fourth support member 162 may be adjacent to and/or between the second end 120 and third end 134 of the tent body 102. In some implementations, individual support members may be made from rigid material (e.g., metal and/or other material). In some implementations, individual support members may be air tubes made from fabric or other material, such that rigidity may be provided by filling the air tubes with air.

Figure 2:
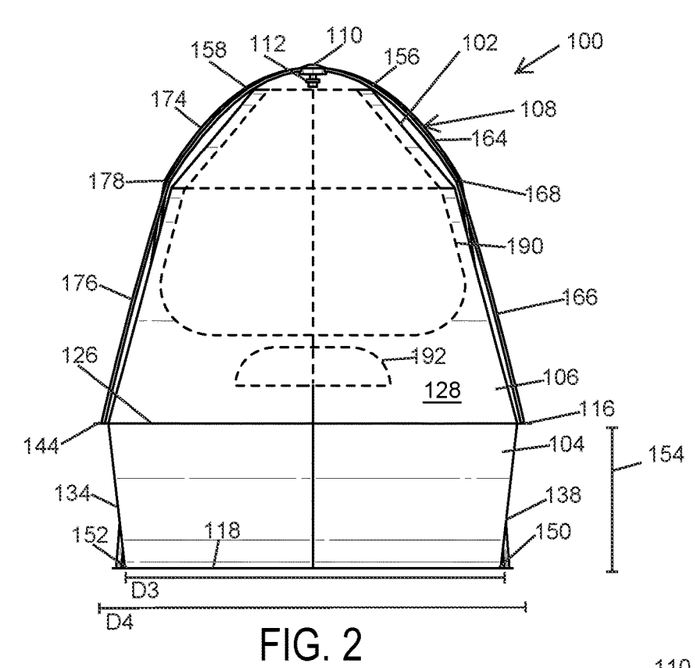
FIG. 2 illustrates a view of a tent apparatus, in accordance with one or more implementations.

Referring to FIG. 2, a first set of the coupling points may be at first end 118 of tent body 102. The first of the coupling points may include one or more of a first coupling point 116, a second coupling point 144, and/or other coupling points. First coupling point 116 and second coupling point 144 may be located at transition portion 126. First coupling point 116 may be located adjacent to fourth end 138 and second coupling point 144 may be located adjacent to third end 134. However, in some implementations, the first of the coupling points including one or more of first coupling point 116, second coupling point 144, and/or other coupling points may be located along the bottom edge of the tent body 102. In this case, the first set of coupling points may sit on the truck bed floor and not the bed rail.

Referring to FIGS. 2 and 3, a second set of the coupling points may be at second end 120 of tent body 102. The second set of coupling points may include one or more of a third coupling point 146, a fourth coupling point 148, and/or other coupling points. Third coupling point 146 and fourth coupling point 148 may be located at or adjacent to corners of the bottom surface at second end 120 of tent body 102. The corners of the bottom surface may include a first corner 150 (See, FIG. 2), a second corner 152 (See, FIG. 2, FIG. 5), a third corner 170, a fourth corner 172, and/or other corners. Third corner 170 may be adjacent to second end 120 and fourth end 138. Fourth corner 172 may be adjacent to third end 134 and second end 120. Thus, third coupling point 146 may be located at third corner 170. Fourth coupling points 148 may be located at fourth corner 172. In some implementations, the second set of coupling points including one or more of third coupling point 146, fourth coupling point 148, and/or other coupling points may be located at a height of transition portion 126 such that the second set of coupling points may sit at the bed rails of the truck bed in the as-used mode.

First corner 150 may be adjacent to a corner of the bed where the first side panel, the front panel, and the bed floor of the bed intersect. Second corner 152 may be adjacent to a corner where second side panel, the front panel, and bed floor of the bed intersect. The bottom surface (not illustrated) may lie on the bed floor between first corner 150 and second corner 152, and third corner 170 and fourth corner 172 (see, FIG. 1). A third distance D3 between first corner 150 and second corner 152 and/or between third corner 170 and fourth corner 172 may be about 1270 mm, about 1450 mm, and/or other distances.

Referring to FIG. 4, the first support member 156 may extend from central hub 110 to first coupling point 116, second support member 158 may extend from central hub 110 to second coupling point 144, third support member 160 may extend from central hub 110 to third coupling point 146, and fourth support member 162 may extend from central hub 110 to fourth coupling point 148. In some implementations, the as-used mode may situate the first set of coupling points of tent body 102 on the bed rails of the bed of the pickup truck adjacent to the front panel (see, e.g., FIG. 6). The as-used mode may situate the second set of coupling points on the tailgate panel in an open position of the tailgate panel. In some implementations, the as-used mode may situate the second set of coupling points on the bed floor whether the tailgate panel is in the open position or closed position of the tailgate panel. In some implementations, the as-used mode may situate the first set of coupling points of tent body 102 on the bed floor of the bed of the pickup truck adjacent to the front panel (see, e.g., FIG. 6). The as-used mode may situate the second set of coupling points on the bed rail(s) of the bed of the pickup truck.

FIG. 2 illustrates a side view of tent apparatus 100, in accordance with one or more implementations. FIG. 2 illustrate the first side surface 128 at the first end 118 of the tent body 102, central hub 110 coupled to central coupling point 112, first support member 156, second support member 158, and the first set of coupling points (i.e., first coupling point 116 and second coupling point 144). First support member 156 adjacent to fourth end 138 may extend from central hub 110 to first coupling point 116. Second support member 158 adjacent to third end 134 may extend from central hub 110 to second coupling point 144. The first set of the coupling points (and/or second set of coupling points) may be in transition portion 126 in between first portion 104 and section portion 106. In FIG. 4, a second distance D2 between first coupling point 116 and second coupling point 144 may be about 1470 mm, about 1650 mm, and/or other distances necessary to accommodate a bed of a pickup truck. Referring back to FIG. 2, side surface 128 may include window element 190, similar to window 142 as described herein, and a vent element 192. A section of first side surface 128 that includes vent element 192 and/or other sections (e.g., access port(s)) may be an opening to the environment, as opposed to another material different from the first material that tent body 102 is configured of.

In some implementations, the use of the term "about" may apply to one or more described numeric values, whether or not explicitly indicated. Those skilled in the art may appreciate that use of "about" does not render the aforementioned numeric values indefinite, but instead may understand that the numeric values convey an intended or desired value where some deviation and/or tolerance may be acceptable without departing from the spirit and intent of the disclosure. This term may generally refer to a range of numbers that one of ordinary skill in the art would consider as a reasonable amount of deviation and/or tolerance from the recited numeric values (i.e., having the equivalent function or result). The deviations and/or tolerances may be understood by a person of ordinary sill in the art as acceptable without altering an intended function or result of the apparatus.

In FIG. 2, a vertical offset distance 154 between the first set of the coupling points and the second set of the coupling points may be defined by a height of the bed rails of bed of the pickup truck. In some implementations, the height of the bed rails, and therefore vertical offset distance 154, may vary based on a size of the pickup truck and bed. For example, the height of the first bed rail and the second bed rail, and therefore vertical offset distance 154, may be about 530 mm, about 560 mm, or other heights.

In some implementations, an individual support member of the one or more support members may comprise multiple segments. Individual segments may be connected by individual hinges. The segments and the hinges may comprise of one or more of durable materials. The hinges may be configured to pivot one or more of 175 degrees, 180 degrees, past 180 degrees, or other degree to articulate between the open position and the closed position. For example, in FIG. 2, segments of support members may include one or more of a first segment 164, a second segment 166, a third segment 174, a fourth segment 176, and/or other segments of the individual support members. First support member 156 may comprise first segment 164 and second segment 166. Thus, first segment 164 may extend from central hub 110 and terminate at a first hinge 168. Second segment 166 may extend from first hinge 168 to a distal end of first support member 156 that couples to first coupling point 116 on tent body 102. Similarly, second support member 158 may comprise third segment 174 and fourth segment 176. Third segment 174 may extend from central hub 110 and terminate at a second hinge 178. Fourth segment 176 may extend from second hinge 178 to a distal end of second support member 158 that couples to second coupling point 144 on tent body 102. Other support members may be similarly configured In some implementations, individual ones of the segments may include telescopically engaged subsegments and/or other types of engagement. The subsegments may facilitate the consolidation of tent apparatus 100 into the closed position as defined by the stowed mode. The subsegments may collapse into one another to reduce the individual segment lengths. In some implementations, telescopically engaged subsegments may allow one or more coupling points to change from being at a level of the bed floor to a level of a bed rail. The subsegments may be configured with snap security, springs, hinges, and/or other components that facilitate the reduction and the expansion of the subsegments. By way of non-limiting illustration, in FIG. 3, third support member 160 may include a fifth segment 180 and a sixth segment 182. Fifth segment 180 may extend from central hub 110 and terminate at a third hinge 184. Sixth segment 182 may extend from third hinge 184 to a distal end of third support member 160 that couples to third coupling point 146 on tent body 102. Sixth segment 182 of third support member 160 may comprise two or more telescopically engaged subsegments. The subsegments may include a first subsegment 186 and a second subsegment 188 where first subsegment 186 may be reduced into second subsegment 188, or second subsegment 188 may be reduced into first subsegment 186. In some implementations, individual subsegments may be engaged by individual hinges such that the subsegments may fold into each other to provide the stowed mode.

FIG. 3 illustrates a side view (e.g., front view) of tent apparatus 100, in accordance with one or more implementations. FIG. 3 illustrates the second side surface 130 at second end 120 of tent body 102, central hub 110 coupled to central coupling point 112, third support member 160, fourth support member 162, and the second set of coupling points (i.e., third coupling point 146 and fourth coupling point 148). Third support member 160 adjacent to fourth end 138 may extend from central hub 110 to third coupling point 146. Fourth support member 162 adjacent to third end 134 may extend from central hub 110 to fourth coupling point 148. The second set of the coupling points may be on the bed floor or the tailgate panel in the open position. In some implementations, the second set of the coupling points may be on the bail rails. As such, third coupling point 146 may be located at third corner 170 of the bottom surface, and fourth coupling point 148 may be located at fourth corner 172 of the bottom surface. A fifth distance D5 between third coupling point 146 and fourth coupling point 148 may be about 1320 mm, about 1500 mm, or other distances.

Second side surface 130 may include door element 140 configured to open and close to enable the users to enter the interior volume of tent body 102 provided by the as-used mode. Door element 140 may include one or more of the fasteners to enable the opening and the closing of door element 140. In some implementations, a width of door element 140 may be about 1050 mm wide or 870 mm wide and enable the users to open and expose a majority the interior volume to the environment. In some implementations, a max width of the door may be larger, e.g., within a range of 1070-1250 mm. Window element 124, similar to window element 142, may be included on door element 140.

FIG. 4 illustrates a top view of tent apparatus 100, in accordance with one or more implementations. FIG. 4 illustrates one or more of top surface 122, first side surface 128, second side surface 130, third side surface 132, fourth side surface 136, central hub 110, first support member 156, second support member 158, third support member 160, fourth support member 162, first coupling point 116, second coupling point 144, third coupling point 146, fourth coupling point 148, and/or other components. First support member 156 may extend from central hub 110 to first coupling point 116 at first end 118, second support member 158 may extend from central hub 110 to second coupling point 144 at first end 118, third support member 160 may extend from central hub 110 to third coupling point 146 at second end 120, and fourth support member 162 may extend from central hub 110 to fourth coupling point 148 at second end 120. Second distance D2 between first coupling point 116 and second coupling point 144 may be about 1470 mm, about 1650 mm, and/or other distances. The one or more windows may include window element 124, window element 142, window element 190, vent element 192, window element 194, and/or other window elements. Window element 124 and window element 194 may be similar to window element 142 and/or window element 124, as described herein. First side surface 128 may include window element 190 and 192, second side surface 130 may include window element 124, third side surface 132 may include window element 142, fourth side surface 136 may include window element 194.

FIG. 5 illustrates a side view of tent apparatus 100, in accordance with one or more implementations. FIG. 5 illustrates third side surface 132 at third end 134 of the tent body 102, central hub 110, second support member 158 adjacent to first end 118 and third end 134, and fourth support member 162 adjacent to second end 120 and third end 134. In some implementations, third side surface 132 may include window element 142. Window element 142 may comprise two or more materials. The second material is joined with the first material at sewn seams in a section that includes window element 142. The joining of the second material and the first material forms a continuous surface. Furthermore, the one or more additional layers of the first material or other ones of the materials may be joined to the continuous surface adjacent to and broader than the sewn seams. The joining of the one or more additional layers may be on the interior, the exterior, or both surfaces of third side surface 132. Edges of the one or more additional layers near the joining with the continuous surface may include one or more of the fasteners. Window element 142 may be the hexagon shape such that a width of window element 142 may be about 1430 mm and/or other widths. In some implementations, windows may be mesh material.

In FIG. 5, central hub 110 is shown coupled to top surface 122 at central coupling point 112. Second support member 158 adjacent to first end 118 and third end 134 may extend from central hub 110 to second coupling point 144 of the first set of coupling points. The first set of coupling points, including second coupling point 144, may be in transition portion 126 that is located in between first portion 104 and second portion 106 at first end 118.

Fourth support member 162 adjacent to second end 120 and third end 134 may extend from central hub 110 to fourth coupling point 148. The second set of coupling points, including fourth coupling point 148, may be located at the corners of the bottom surface at second end 120 and at the tailgate panel. That is, fourth coupling point 148 may be located at fourth corner 172. Vertical offset distance 154 between the first set of coupling points and the second set of coupling points may be defined by the height of the bed rails. In some implementations, a height of first portion 104 may be the height of the bed rails and thus vertical offset distance 154. In some implementations, first distance D1 between top surface 122 and the bottom surface may be about 1830 mm and/or distances. First distance D1 may enable some of the users to stand and walk around and/or within the interior volume in addition to sitting and lying down. However, in some implementations, distance D1 may be lower, such as 1550 mm or less. Central coupling point 112 coupling top surface 122 to central hub 110 may contribute to first distance D1. A fourth distance D4 between second corner 152 and fourth corner 172 (and between first corner 150 and third corner 170 that are opposite second corner 152 and fourth corner 172, respectively) may be about 2030 mm, about 2180 mm, and/or other distances to accommodate a bed of a pickup truck.

FIG. 6 illustrates tent apparatus 100 in the as-used mode, in accordance with one or more implementations. Tent apparatus 100 may be positioned in a bed 50 of pickup truck 52. Bed 50 may include one or more of a first side panel 54, a second side panel 56 opposite first side panel 54, a tailgate panel 58, a bed floor 60, and/or other components. First side panel 54 and second side panel 56 may include bed rails. The bed rails may include a first bed rail (not illustrated) on first side panel 54 and a second bed rail 62 on second side panel 56. In some implementations, a length of the bed rails may be about 1520 mm, about 1700 mm, and/or other distances. In some implementations, the length of the bed rails may be the same length or about the same length as bed floor 60. A distance between the first bed rail and second bed rail 62 may be 1470 mm, about 1650 mm, and/or other distances. The bottom surface (not illustrated) of tent body 102 may lie on bed floor 60. A width of the bottom surface may be about 1270 mm, about 1450 mm, and/or other widths. A length of the bottom surface that lies along bed floor 60 to an edge of tailgate panel 58 in an opened position may be 2030 mm, about 2180 mm, and/or other lengths. Vertical offset distance 154 between the first set of coupling points (i.e., first coupling point 116 and second coupling point 144) and the second set of coupling points (i.e., third coupling point 146 and fourth coupling point 148) may be a height of the bed rails. The height of the bed rails may be about 530 mm, about 560 mm, and/or other heights.

Returning to FIG. 1, in some implementations, the features and/or functionality of frame 108 may be employed for structures other than a tent body. For example, frame 108 may be utilized to structurally support a canopy body (not shown) to create a canopy apparatus. The canopy apparatus may be a type of sunshade structure without the features of enclosing a defined volume that is typically associated with tents. A canopy body may include one or more of a top surface, one or more partial side surfaces, and/or other surfaces. In some implementations, the top surface may comprise a majority of the canopy body. In some implementations, a partial side surface may extend part of the way down the side of the body without fully enclosing the side as to form a sidewall. However, in some implementations, one or more sidewalls may be fully formed. A central hub may be positioned at central portion of the top surface. A set of support members may extend from the central hub to terminating ends which form feet of the canopy apparatus. The canopy body may be suspended by the frame 108 and/or structurally supported so that the frame imparts some rigidity to the canopy apparatus.

In some implementations, a canopy apparatus (not shown) may be used as a rainfly for a tent, such as tent apparatus 100. For example, the canopy apparatus may form an outer structure, and a tent may be configured and/or adapted to fit within and/or under the canopy apparatus. The tent may be removable from the canopy apparatus so that the canopy apparatus may be implemented on its own as a sunshade, for example.

Figure 7:
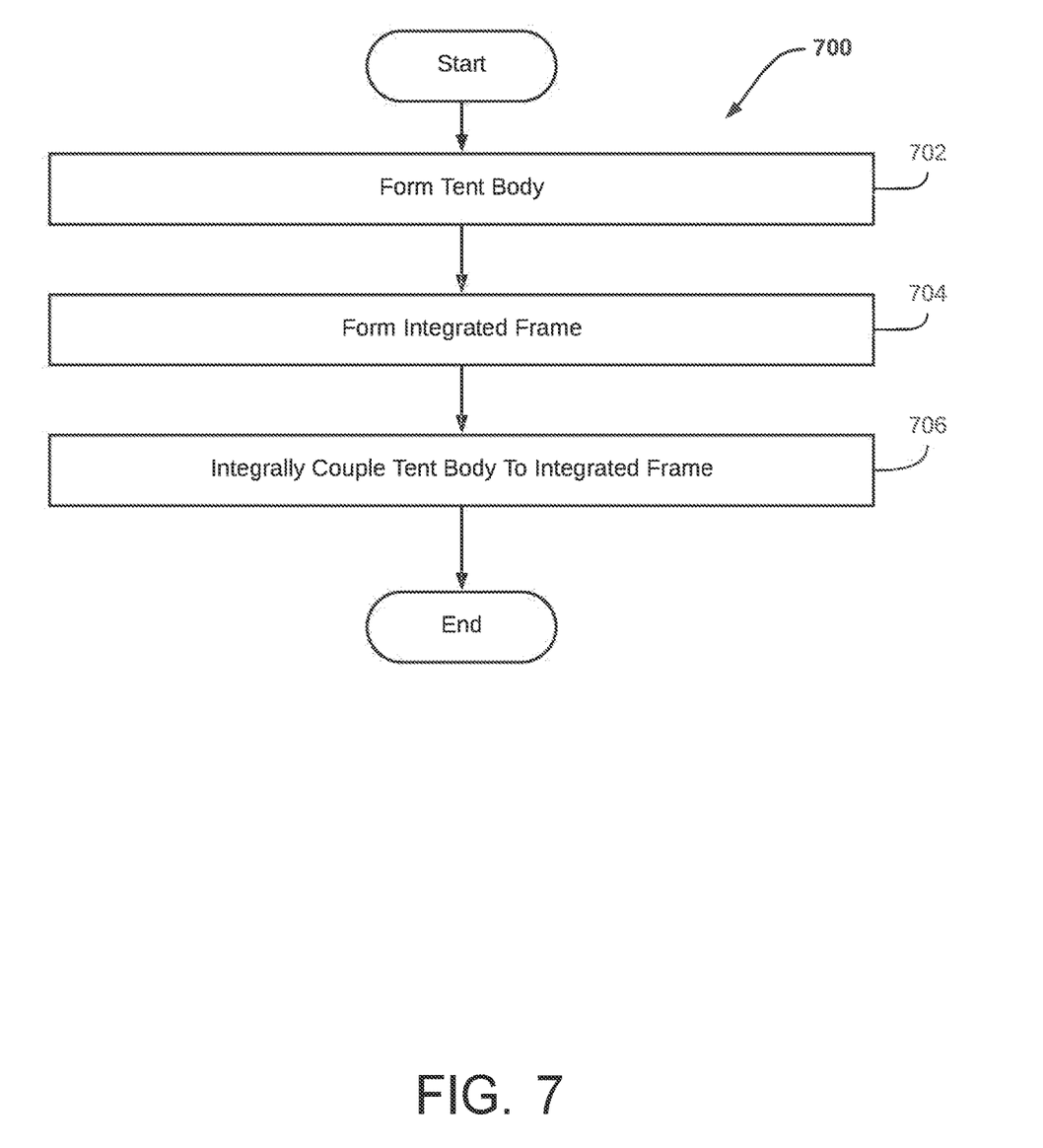
FIG. 7 illustrates a method of manufacture of a tent apparatus.

FIG. 7 illustrates a method 700 of manufacture of a tent apparatus, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented using manual and/or automated manufacturing techniques. A manufacturing techniques may include one or more techniques used by skilled artisans in manufacture. Techniques may include one or more of sewing, stitching, cutting, casting, extruding, grinding, bending, forging, stamping, turning, additive manufacturing, powder metallurgy, metal injection molding, compression molding, drilling, riveting, screwing, welding, sanding, and/or other techniques. Other techniques known to skilled artisans are also within the scope of the present disclosure. An automated manufacturing technique may include machines and one or more processing devices. By way of non-limiting illustration, a machine may include one or more of plastic injection molding machine, CNC machine, CNC lathe, automated sewing machine, and/or other machines. A machine may include one or more processing device, non-transitory electronic storage, and/or other components. The one or more processing devices and/or machines may include one or more devices executing some or all of the operations of method 700 in response to instructions stored electronically on electronic storage medium. The one or more processing devices and/or machines may include one or more devices configured through hardware, firmware, and/or software to be specifically designed for execution of one or more of the operations of method 700.

An operation 702 may form a tent body. The tent body may include a first portion, a second portion, and/or other portions. The first portion may be configured to be substantially enclosed within the bed of the pickup truck in an as-used mode of the tent apparatus. The second portion may extend from the first portion. Thus, the second portion may be exposed to an environment above the bed of the pickup truck in the as-used mode. The tent body may be the same as or similar to tent body 102 shown in the figures and described herein.

An operation 704 may form a frame. The frame may be integrally coupled to the tent body. The frame may be configured to articulate between a closed position and an open position. The closed position may correspond to a stowed mode of the tent apparatus where the frame and the tent body are consolidated into a stowed volume. The open position may correspond to the as-used mode of the tent apparatus such that the frame structurally supports the tent body to provide rigidity for the tent apparatus. The frame may include a central hub, one or more support members, and/or other components. For example, the frame, the central hub, and the one or more support members may be the same as or similar to frame 108, central hub 110, first support member 156, second support member 158, third support member 160, fourth support member 162, respectively, shown in the figures and described herein.

An operation 706 may integrally couple the tent body to the frame. The integral coupling may include one or more of coupling the central hub to a central coupling point on the tent body, coupling the one or more support members to coupling points on the tent body, and/or other operations. For example, the central coupling point and the coupling points may be the same as or similar to central coupling point 112, first coupling point 116, second coupling point 144, third coupling point 146, and/or fourth coupling point 148, shown in the figures and described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A tent apparatus configured for a bed of a pickup truck, the tent apparatus comprising:

a tent body, the tent body including a first portion and a second portion, wherein the first portion is configured to be substantially enclosed within the bed of the pickup truck in an as-used mode of the tent apparatus, wherein the second portion extends from the first portion such that the second portion is exposed to an environment above the bed of the pickup truck in the as-used mode;

a frame, the frame being integrally coupled to the tent body, the frame being configured to articulate between a closed position and an open position, wherein the closed position corresponds to a stowed mode of the tent apparatus where the frame and the tent body are consolidated into a stowed volume, wherein the open position corresponds to the as-used mode of the tent apparatus such that the frame structurally supports the tent body to provide rigidity for the tent apparatus, the frame comprising:
 a central hub coupled to the tent body at a central coupling point; and
 one or more support members that extend from the central hub to coupling points on the tent body to integrate the frame with the tent body, such that a first set of the coupling points are at a first end of the tent body, and a second set of the coupling points at a second end of the tent body, the second end being opposite the first end;
 wherein the first set of the coupling points are located at a transition portion at the first end of the tent body where the first portion and the second portion of the tent body meet; and
 wherein the second set of the coupling points are located at corners of a bottom surface of the tent body at the second end of the tent body.

2. The tent apparatus of claim 1, wherein the tent body includes a set of side surfaces, a top surface, and the bottom surface, the tent body enclosing an interior volume, wherein in the as-used mode the bottom surface lies on a bed floor of the bed of the pickup truck, and the top surface is opposite the bottom surface, wherein the top surface includes the central coupling point, wherein a first side surface of the set of side surfaces is at the first end of the tent body and a second side surface of the set of side surfaces is at the second end of the tent body opposite the first end, wherein a third side surface of the set of side surfaces is at a third end of the tent body and a fourth side surface of the set of side surfaces is at a fourth end of the tent body opposite the third end.

3. The tent apparatus of claim 2, wherein the second side surface includes a door element, wherein one or more sections of one or more of the first side surface, the third side surface, or the fourth side surface include one or more window elements.

4. The tent apparatus of claim 1, wherein the tent body includes one or more materials comprising one or more of a polyester, a nylon, a canvas, an acrylic, a polyester mesh, a clear vinyl, or a clear EVA.

5. The tent apparatus of claim 1, wherein a vertical offset distance between the first set of the coupling points and the second set of the coupling points is defined by a height of bed rails of the bed of the pickup truck.

6. The tent apparatus of claim 1, wherein an individual support member of the one or more support members comprises multiple segments, wherein individual segments are connected by individual hinges, such that a first support member comprises a first segment and a second segment, the first segment extending from the central hub and terminating at a first hinge, and wherein the second segment extends from the first hinge to a distal end of the first support member that couples to one of the coupling points on the tent body.

7. The tent apparatus of claim 6, wherein the individual segments include telescopically engaged subsegments, such that the second segment of the first support member is comprised of two telescopically engaged subsegments, and wherein the telescopically engaged subsegments are configured to facilitate consolidation to the stowed mode.

8. A tent apparatus configured for a bed of a pickup truck, the tent apparatus comprising:
 a tent body, the tent body including a first portion and a second portion, wherein the first portion is configured to be substantially enclosed within the bed of the pickup truck in an as-used mode of the tent apparatus, wherein the second portion extends from the first portion such that the second portion is exposed to an environment above the bed of the pickup truck in the as-used mode;
 a frame, the frame being integrally coupled to the tent body, the frame being configured to articulate between a closed position and an open position, wherein the closed position corresponds to a stowed mode of the tent apparatus where the frame and the tent body are consolidated into a stowed volume, wherein the open position corresponds to the as-used mode of the tent apparatus such that the frame structurally supports the tent body to provide rigidity for the tent apparatus, the frame comprising:
  a central hub coupled to the tent body at a central coupling point; and
  one or more support members that extend from the central hub to coupling points on the tent body to integrate the frame with the tent body, such that a first set of the coupling points are at a first end of the tent body, and a second set of the coupling points at a second end of the tent body, the second end being opposite the first end; and
 wherein the as-used mode situates i) the first set of the coupling points of the tent body on bed rails of the bed of the pickup truck, and ii) the second set of the coupling points on an open tailgate panel of the bed.

9. A method of manufacture of a tent apparatus configured for a bed of a pickup truck, the method comprising:
 forming a tent body, the tent body including a first portion and a second portion, wherein the first portion is configured to be substantially enclosed within the bed of the pickup truck in an as-used mode of the tent apparatus, wherein the second portion extends from the first portion such that the second portion is exposed to an environment above the bed of the pickup truck in the as-used mode;
 forming a frame, the frame being integrally coupled to the tent body, the frame being configured to articulate between a closed position and an open position, wherein the closed position corresponds to a stowed mode of the tent apparatus where the frame and the tent body are consolidated into a stowed volume, wherein the open position corresponds to the as-used mode of the tent apparatus such that the frame structurally supports the tent body to provide rigidity for the tent apparatus, the frame comprising a central hub and one or more support members that extend from the central hub;
 integrally coupling the tent body to the frame such that the central hub is coupled to the tent body at a central coupling point, and the one or more support members that extend from the central hub are coupled to coupling points on the tent body to integrate the frame with the tent body, such that a first set of the coupling points are at a first end of the tent body, and a second set of the coupling points at a second end of the tent body, the second end being opposite the first end;
 wherein the first set of the coupling points are located at a transition portion at the first end of the tent body where the first portion and the second portion of the tent body meet; and
 wherein the second set of the coupling points are located at corners of a bottom surface of the tent body at the second end of the tent body.

10. The method of claim 9, wherein the tent body includes a set of side surfaces, a top surface, and the bottom surface, the tent body enclosing an interior volume, wherein in the as-used mode the bottom surface lies on a bed floor of the bed of the pickup truck, and the top surface is opposite the bottom surface, wherein the top surface includes the central coupling point, wherein a first side surface of the set of side surfaces is at the first end of the tent body and a second side surface of the set of side surfaces is at the second end of the tent body opposite the first end, wherein a third side surface of the set of side surfaces is at a third end of the tent body and a fourth side surface of the set of side surfaces is at a fourth end of the tent body opposite the third end.

11. The method of claim 10, wherein the second side surface includes a door element, wherein one or more sections of one or more of the first side surface, the third side surface, or the fourth side surface include one or more window elements.

12. The method of claim 9, wherein the tent body includes one or more materials comprising one or more of a polyester, a nylon, a canvas, an acrylic, a polyester mesh, a clear vinyl, or a clear EVA.

13. The method of claim 9, wherein a vertical offset distance between the first set of the coupling points and the second set of the coupling points is defined by a height of bed rails of the bed of the pickup truck.

14. The method of claim 9, wherein an individual support member of the one or more support members comprises multiple segments, wherein individual segments are connected by individual hinges, such that a first support member comprises a first segment and a second segment, the first segment extending from the central hub and terminating at a first hinge, and wherein the second segment extends from the first hinge to a distal end of the first support member that couples to one of the coupling points on the tent body.

15. The method of claim 14, wherein the individual segments include telescopically engaged subsegments, such that the second segment of the first support member is comprised of two telescopically engaged subsegments, and wherein the telescopically engaged subsegments are configured to facilitate consolidation to the stowed mode.

16. A method of manufacture of a tent apparatus configured for a bed of a pickup truck, the method comprising:
forming a tent body, the tent body including a first portion and a second portion, wherein the first portion is configured to be substantially enclosed within the bed of the pickup truck in an as-used mode of the tent apparatus, wherein the second portion extends from the first portion such that the second portion is exposed to an environment above the bed of the pickup truck in the as-used mode;
forming a frame, the frame being integrally coupled to the tent body, the frame being configured to articulate between a closed position and an open position, wherein the closed position corresponds to a stowed mode of the tent apparatus where the frame and the tent body are consolidated into a stowed volume, wherein the open position corresponds to the as-used mode of the tent apparatus such that the frame structurally supports the tent body to provide rigidity for the tent apparatus, the frame comprising a central hub and one or more support members that extend from the central hub;
integrally coupling the tent body to the frame such that the central hub is coupled to the tent body at a central coupling point, and the one or more support members that extend from the central hub are coupled to coupling points on the tent body to integrate the frame with the tent body, such that a first set of the coupling points are at a first end of the tent body, and a second set of the coupling points at a second end of the tent body, the second end being opposite the first end; and
wherein the as-used mode situates i) the first set of the coupling points of the tent body on bed rails of the bed of the pickup truck, and ii) the second set of the coupling points on an open tailgate panel of the bed.

* * * * *